United States Patent [19]

Fellinger

[11] 4,357,657

[45] Nov. 2, 1982

[54] FLOPPY-DISK INTERFACE CONTROLLER

[75] Inventor: Michael W. Fellinger, Boulder, Colo.

[73] Assignee: Monolithic Systems, Corp., Englewood, Colo.

[21] Appl. No.: 69,302

[22] Filed: Aug. 24, 1979

[51] Int. Cl.³ ............................................ G06F 13/00
[52] U.S. Cl. ................................................. 364/200
[58] Field of Search ... 364/200 MS File, 900 MS File

[56] References Cited

U.S. PATENT DOCUMENTS

| | | | |
|---|---|---|---|
| 3,046,528 | 7/1962 | Rowe et al. | 364/900 |
| 3,596,252 | 7/1971 | Duncan | 364/900 |
| 3,824,551 | 7/1974 | Arciprete et al. | 364/200 |
| 3,895,355 | 7/1975 | Shorrock | 364/900 |
| 3,958,224 | 5/1976 | Boyd et al. | 364/900 |
| 4,003,027 | 1/1977 | DiMatteo | 364/900 |
| 4,048,625 | 9/1977 | Harris, Jr. et al. | 364/900 |

*Primary Examiner*—Gareth D. Shaw
*Assistant Examiner*—C. T. Bartz
*Attorney, Agent, or Firm*—Daniel M. Rosen

[57] ABSTRACT

A device operable as an interface controller for a defined data bus, wherein the interface controller operates to transfer entire blocks of data, bidirectionally, one byte at a time, while making each byte available as it is received for use by either the computer or by the memory. In addition, the present invention utilizes an interface controller with a single flow-through register, and pluralities of switches, operable in accordance with decoded commands for transferring data in the aforementioned manner in either direction through the same register.

11 Claims, 8 Drawing Figures

FLOPPY-DISK INTERFACE CONTROLLER

BACKGROUND OF THE INVENTION

The present invention relates to computer components and more particularly to an interface controller for controlling the relationship between a central processor and a peripheral data input/output device.

In the normal operation of computer equipment, it is desirable to interconnect various types of input/output devices to the central processing units. In defining the interface between a central processor and a peripheral device, it is often necessary to take into account the manner in which the peripheral device operates in terms of storage and retrieval of information. With respect to current types of peripheral units dealing with the storage and recording of information on magnetic media, it is often required to tie up computer time during the period of time which is necessary to take the information stored on a magnetic media and transfer it to the working memory of a data processor. The reverse is also true. This is a requirement of the real time nature of the peripheral device and fails to take into account the fact that the computer or data processor is operating at a sufficiently high speed that it is capable of carrying out independent operations during the time that storage and retrieval of stored information is taking place.

SUMMARY OF THE INVENTION

It is therefore the object of the present invention to provide an interface controller which will establish a protocol between a data bus which interfaces with a data processor and a peripheral unit such as a disk memory which will enable storage to and retrieval of information from the memory without interferring with the normal operation of the computer.

In addition to requiring extensive computer time for storage and retrievel, the transfer of information back and forth from a storage device often encounters interference problems which are relatively difficult to detect by the operator.

It is therefore another object of the present invention to provide an interface controller which will enable the operator to determine whether storage and retrieval of information is proceeding satisfactorily.

The foregoing described objects are achieved in accordance with the present invention by the provision of a device operable as an interface controller for a defined data bus, wherein the interface controller operates to transfer entire blocks of data, bidirectionally, one byte at a time, while making each byte available as it is received for use by either the computer or by the memory. In addition, the present invention utilizes an interface controller with a single flow-through register, and pluralities of switches, operable in accordance with decoded commands for transferring data in the aforementioned manner in either direction through the same register. This results in efficiencies and economies heretofore unavailable in prior art devices, while yet enabling the accomplishment of the objects of the stated invention.

High data transfer rates are thus achieved without components such as a bus master direct memory access controller and other real time systems, and results in a more efficient operation with pluralities of disk systems that do not contend with the processors for the data bus. In addition, the concept of employing first-in first-out data bytes allows leading of the first data byte that falls through the flow-through register. As a result, the latency introduced by other buffering algorithms that require an entire sector or data block to be read before the computer or memory may receive data is therefore avoided.

The foregoing objects and brief description of the present invention will become more apparent from the following more detailed description and appended drawings, wherein:

BRIEF FIGURE DESCRIPTION

Figure 3A:
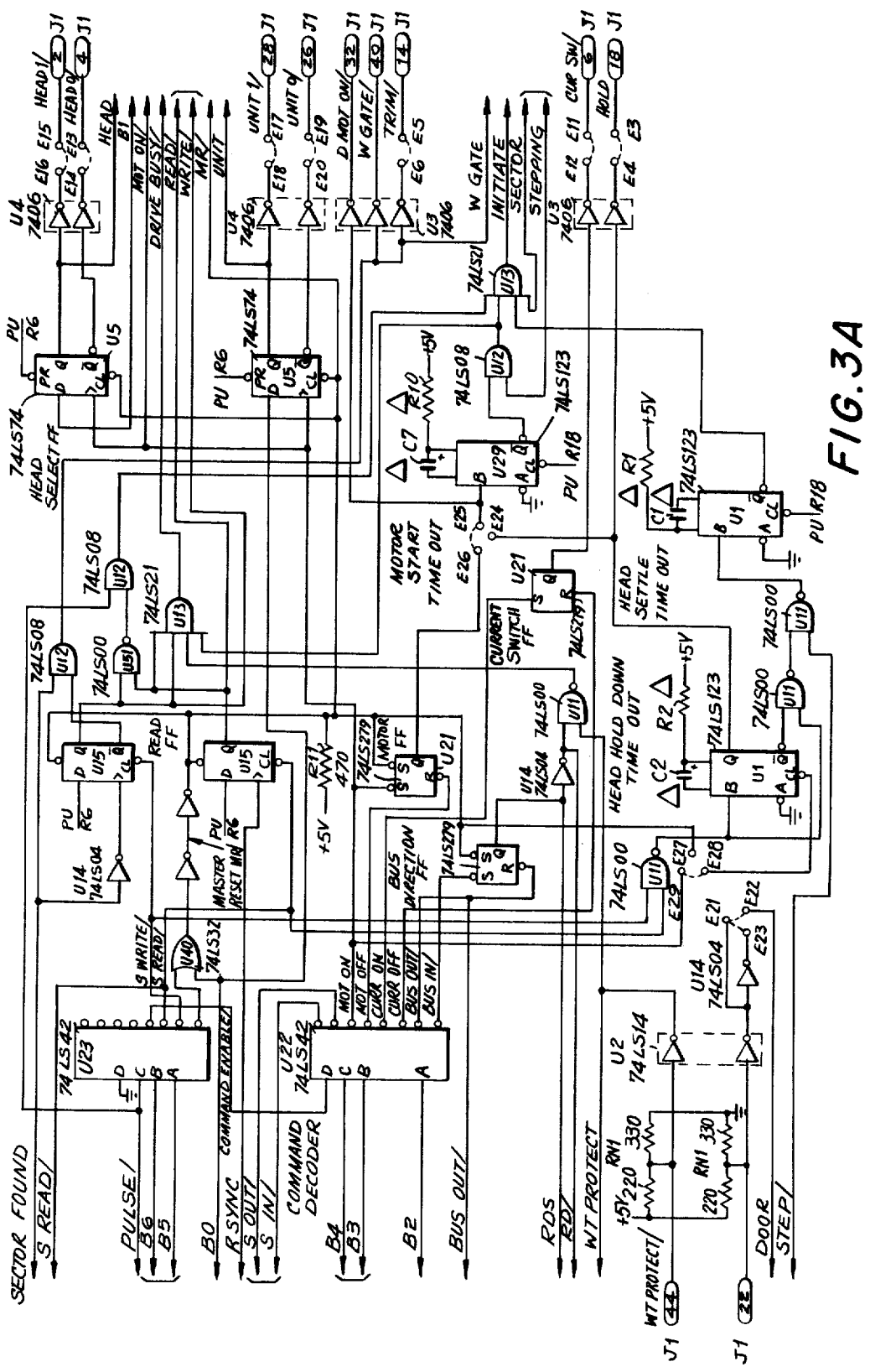
Figure 3B:
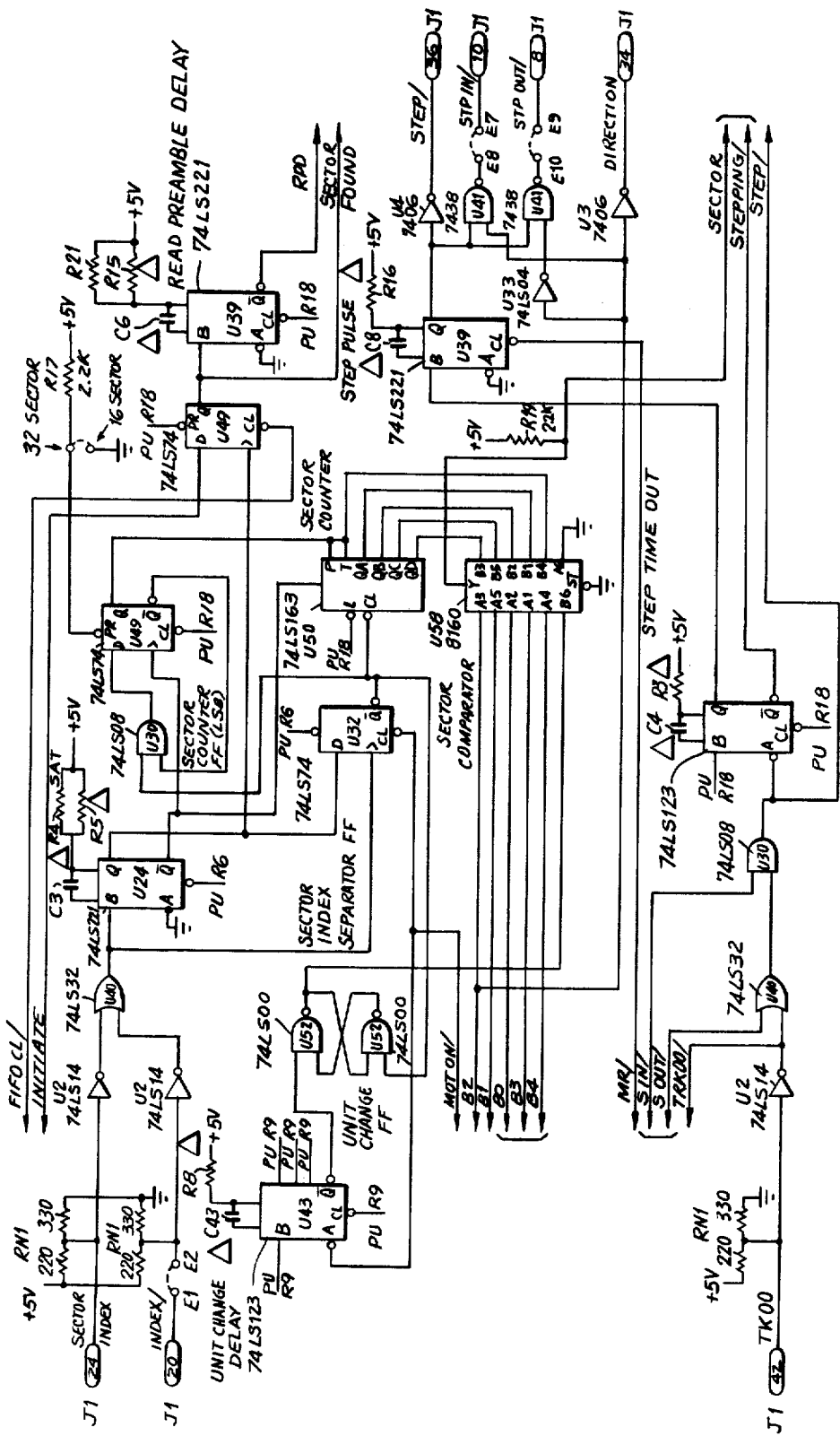
Figure 3C:
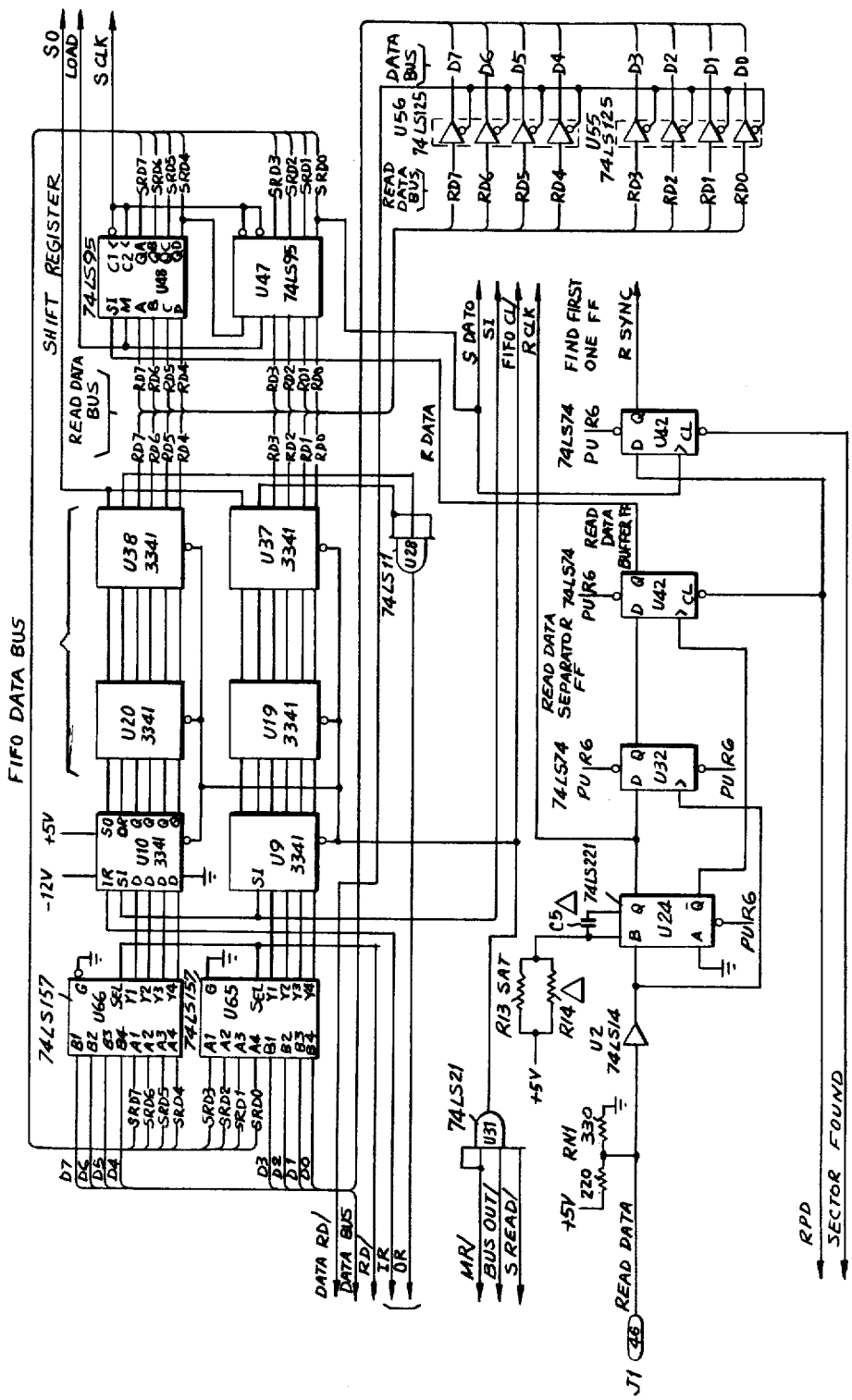
Figure 3D:
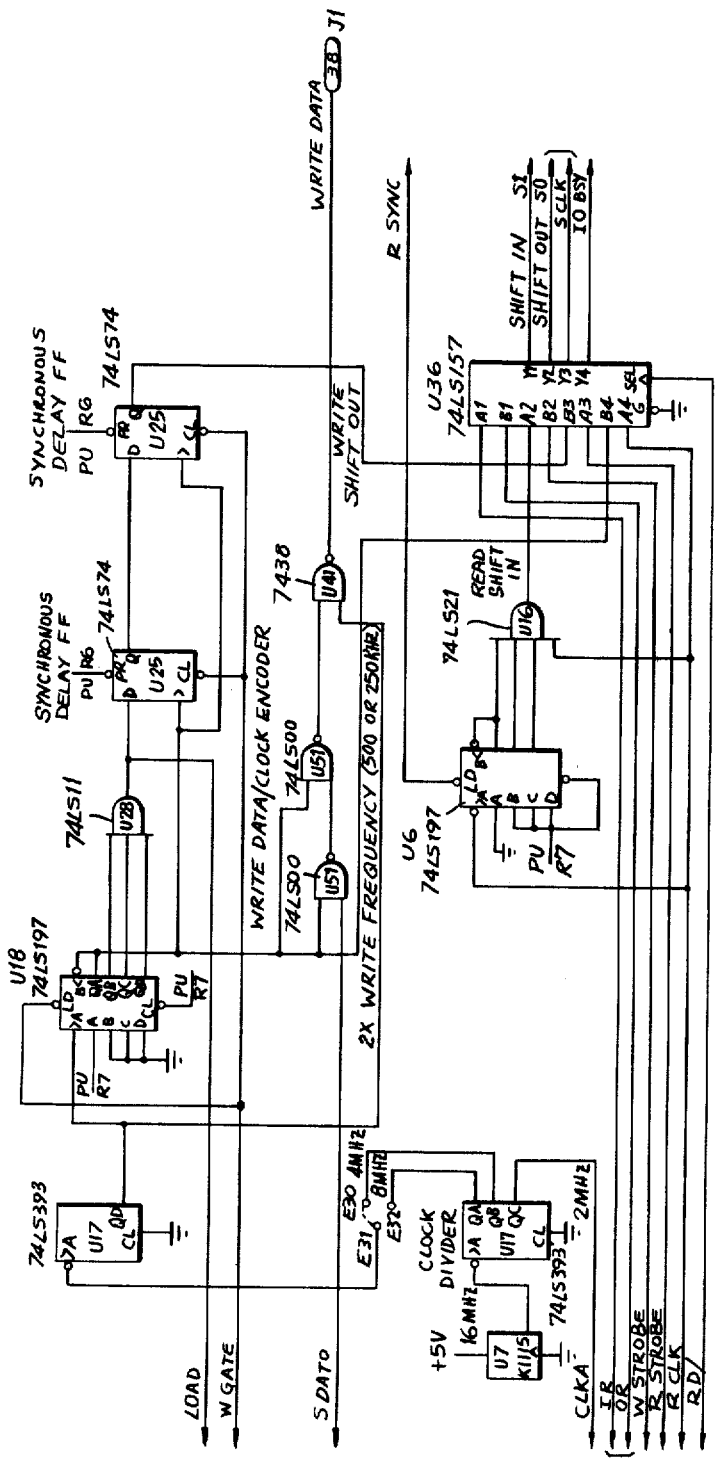
Figure 3E:
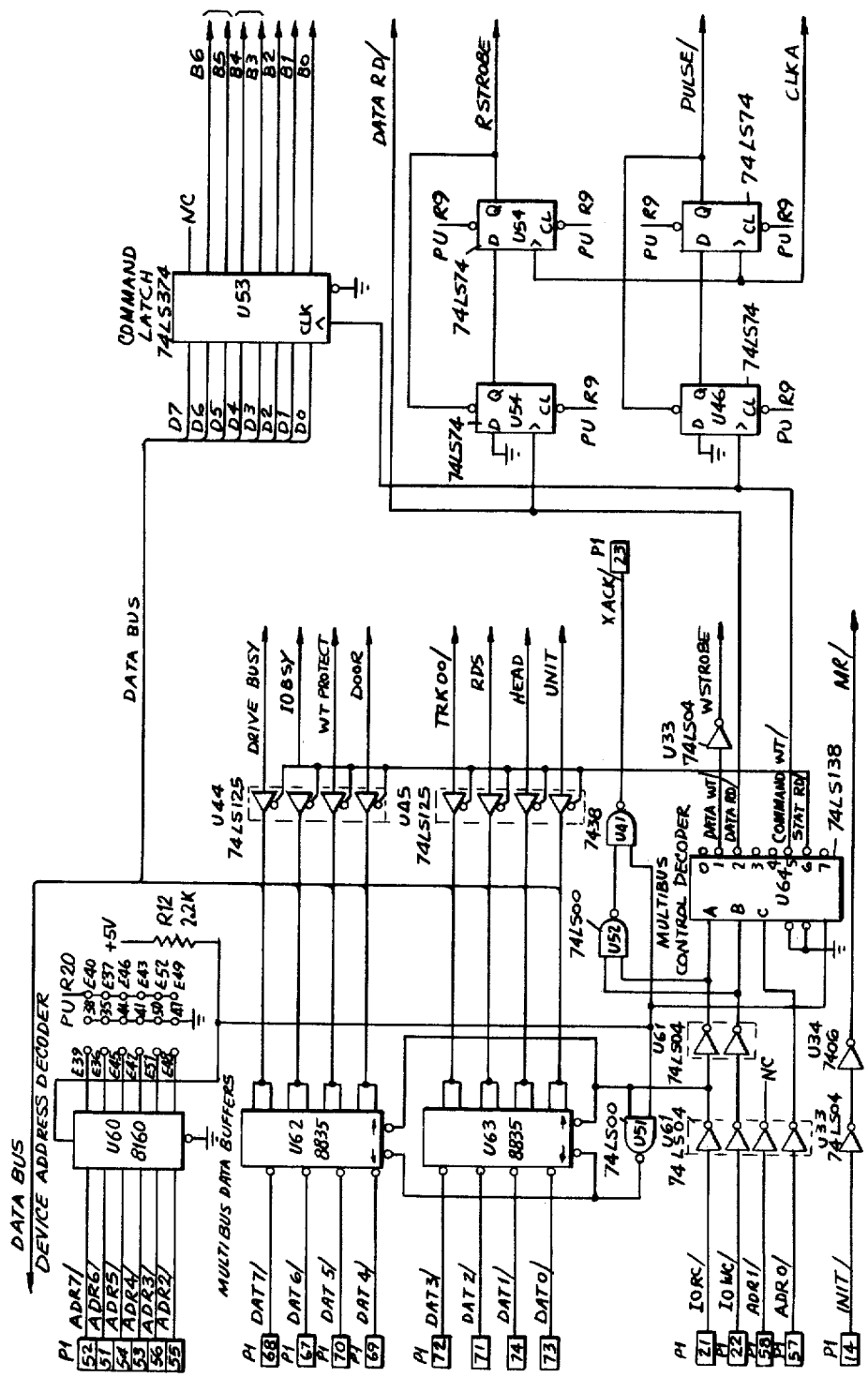
Figure 4:
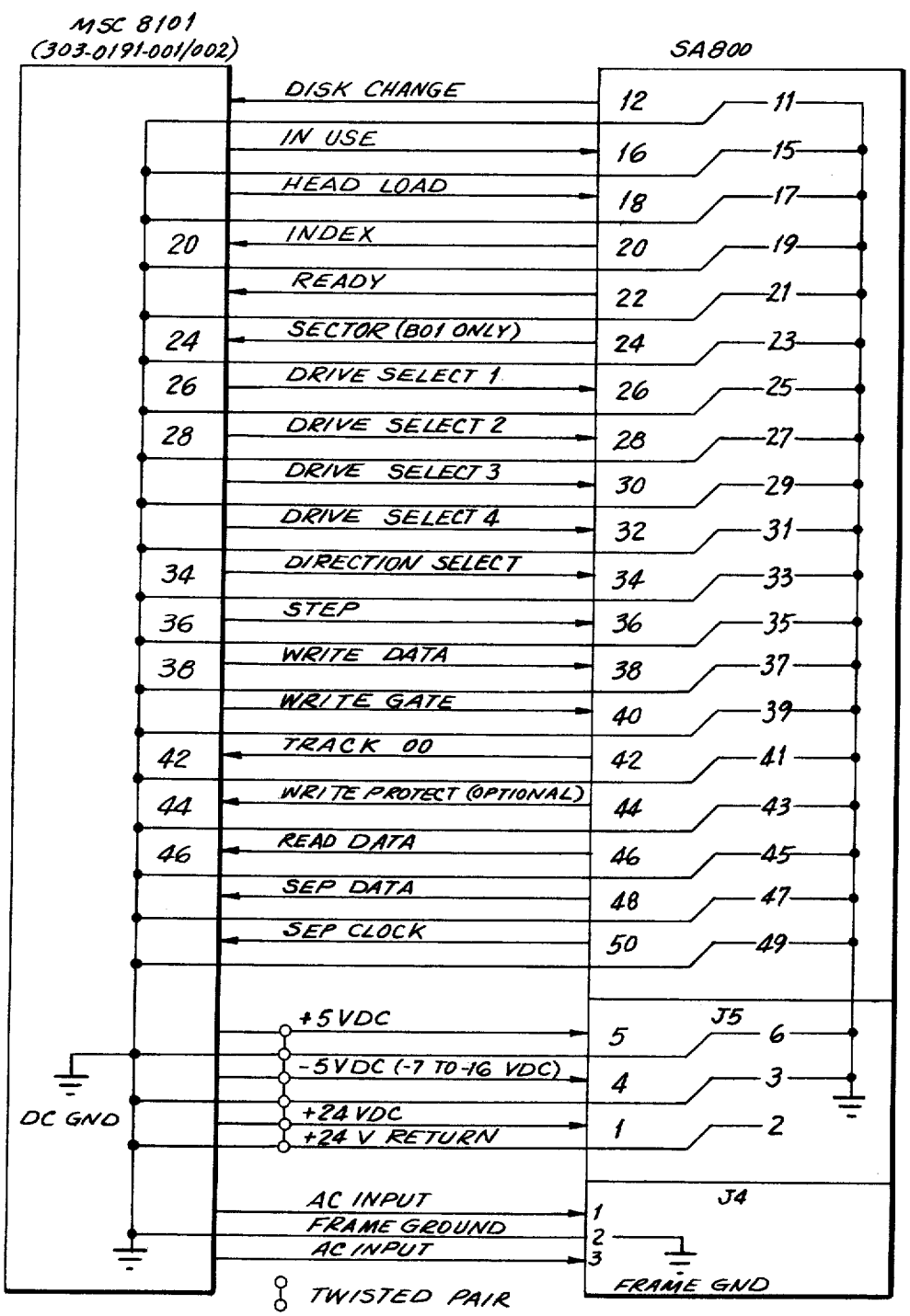

FIG. 3A–F is a detailed description of the logic diagram of the present invention; and FIG. 4 is a pin interconnection between the present invention and a peripheral device.

DETAILED DISCLOSURE OF THE INVENTION

It should be noted with reference to FIGS. 3A–F that corresponding connections are illustrated by common labels on arrow terminated lines. The arrow terminations indicate that the connection transfers to another logic drawing in the FIG. 3 series. Thus, for example, SECTOR FOUND in the upper left hand corner of FIG. 3A is commonly connected to like labelled arrowheads in FIGS. 3B and 3C. Round terminations (J1 connections) couple to the peripheral unit employed, and square termination (P1 connections) to the bus lines.

Figure 1:
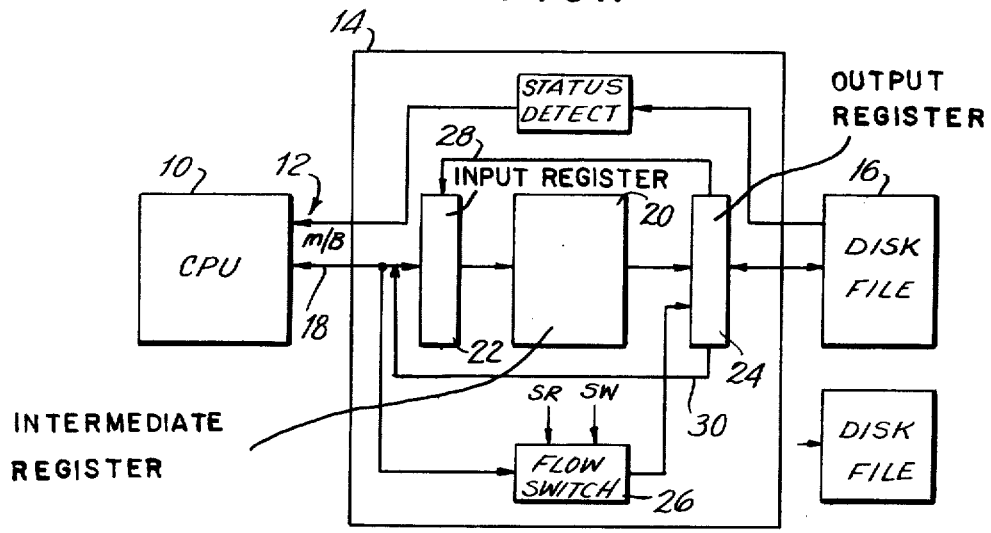
FIG. 1 is an illustration of the general configuration of the present invention.

With reference to FIG. 1, the general configuration of a system operative in accordance with the present invention is illustrated. The basic processor or computer, designated CPU, 10 interfaces with the system of the present invention along a group of parallel lines 12. These parallel lines 12 may be a standard set of single lines consisting of a plurality of address lines and data lines, interrupt lines, bus control signals, data transfer signals and power distribution. A conventional and commercially available standard set of signal lines is known as the MULTIBUS, a registered trademark of the Intel Corporation, Santa Clara, Calif. These lines interconnect a family of system modules such as computers, memory boards, I/O boards and/or a combination of these components. A low level signal, 0 volts, on these lines represent a logical "1" and a high level signal, nominally between 3 and 5 volts, on these lines representing logic "0". Data transfers along the MULTIBUS work on a handshake principle, no one module depending upon another for internal timing. After the computer 10 issues a command to read from or write into a location specified on the address lines, the computer waits until the storage interface system acknowledges that a transfer has taken place. In accordance with the present invention, an interface system 14 is provided to access pluralities of data storage devices 16, such as disk files. Data flow may be in either one of two directions as shown by the specific MULTIBUS data line 18 in accordance with the commands provided by the computer 10. In a read command, information from the storage units 16 will be read in accordance with proper timing and placed into the CPU 10 along the MULTIBUS lines 12. In a write command, the opposite data flow is realized.

In accordance with the present invention, the interface or information transfer system 14 employed between the data bus 18 and the storage devices 16 will include an intermediate storage device 20 and appropriate input register 22 and output register 24. A flow of data through the intermediate storage means 20 is controlled by means of a flow switch 26. In accordance with the invention, the intermediate storage means is a first-in first-out serial memory adapted to receive data in portions of a data block, storing the data until a full data block is achieved. In connection with disk storage, a conventional unit of disk storage is a sector. A sector is comprised of a plurality of bytes of information, each byte consisting conventionally of an 8 bit word. In conventional equipment, a sector can typically be 192 bytes including data words postamble and preamble, of 8 bits each. Since it is often desirable to transfer only one or a portion of a sector at one time, the use of the intermediate storage means permits such a transfer. The intermediate storage means is preferably a first-in first-out serial memory, as will be described in further detail below, which permits each entered data word placed on the input register 22 thereof to transfer automatically by means of internal clocking to the last occupied cell region of the serial memory 20. When the first data word present at the output side of the serial memory 20 is transferred via the output register 24 to either the disk or the MULTIBUS, the next data word is automatically stepped into the now vacant cell to take its place. Thus, the system is independent of timing and the computer need not be occupied with transfer of an entire sector to or from the disk at one time, but can instead transfer some sector words or portions thereof, perform other functions, then come back to complete the functional transfer of the sector information. Thus, the first byte of information from an individual sector is available as soon as read, rather than requiring the system to wait until the entire sector has been read off the disk as is conventional in prior art systems.

The system may be bidirectional in that data may be read from the disk to the MULTIBUS, or from the MULTIBUS to the disk in accordance with the read or write commands provided by the MULTIBUS. This is functionally effected by means of the flow switching means 26 shown schematically in FIG. 1. Upon receipt of a command to read, the flow switching means 26, which is coupled to the MULTIBUS, provides an appropriate switching signal to the register 24. In a reading operation, the output from the flow switching means 26 will result in a transfer of information from the disk to the MULTIBUS in accordance with the following sequence. Sector information is read from the disk 16 through the register 24, along the recirculating data line 28 to the register 22. The data is then read from the register 22 through the serial memory 20 in the manner described above. When strobing of the input is desired onto the MULTIBUS, such strobing is effected through the output stage of the serial memory 20 again through the register 24 along the recirculating path 30, whereupon it is placed upon the bidirectional MULTIBUS line 18. In the presence of a write command, the data flow occurs from the MULTIBUS line 18 through the register 22, into the serial memory 20, wherein it filters through stage by stage as described above, and then through the register 24 into the disk file 16. Thus, the flow switching means acts as a bus director controlling the manner wherein data flow is achieved in accordance with the desired commands. As shown in FIG. 1, the flow switching means 26 receives two gating signals, SR and SW, which, in conjunction with the read and write commands from the MULTIBUS, effect the operation of the system.

Figure 2:
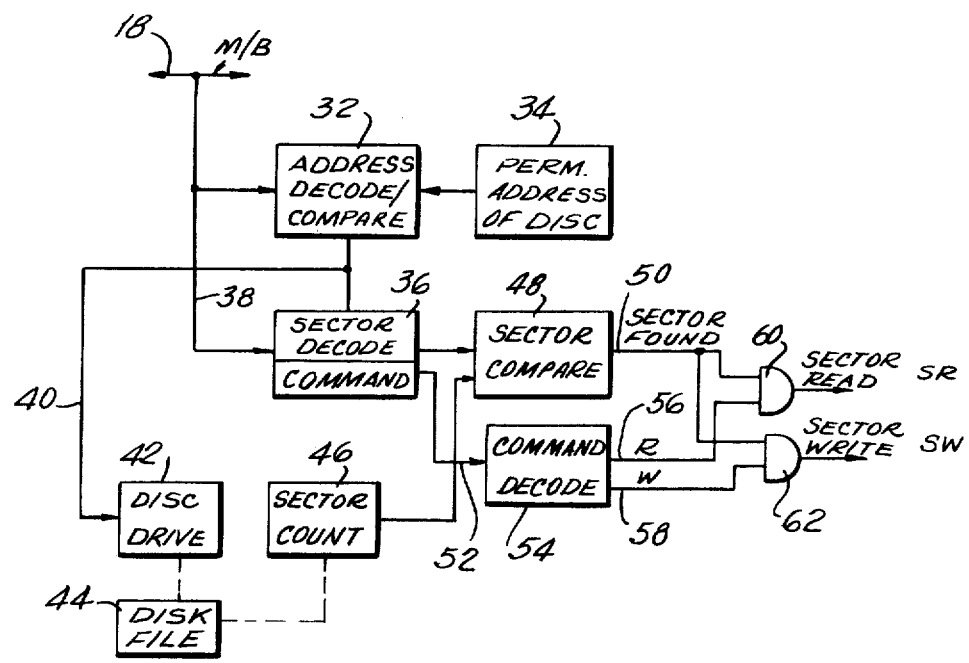
FIG. 2 is a more detailed description of the operative system of the present invention.

With reference to FIG. 2, the SR and SW signals are activated in accordance with the desired address of the particular sector on the particular disk which has been selected. Thus, a disk address is provided along the MULTIBUS line 18 to an address decoder 32 which performs a comparison function with a permanent address reference device 34, representing the address of a particular local disk unit. It will be understood that several of these units, corresponding to several disk files, will be present in the system of the present invention. Indication of a compare signal, indicating a match, acts to select the local disk by providing a compare signal to a sector decode and command logic unit 36. The sector decode command unit would indicate an acceptance of the particular sector address for that disk selected, and which is provided along the line 38 from the MULTIBUS 18. At the same time, the output of the address decoder and comparator 32 will be applied along the line 40, causing the initiation of the disk drive 42. The disk drive 42 will in turn drive the disk file 44. A sector counting mechanism 46, operates to count the sector as the disk file rotates and provides a sector count signal to a sector compare circuit 48. The sector compare circuit 48 compares the actual sector counted to the decoded sector desired and upon a match provides a sector found signal along its output line 50. At the same time, the sector decode and command circuit 36 provides the appropriate read or write command from the MULTIBUS along the line 52 to the command decoder 54 which in turn provides a read or write signal along the respective output lines 56 and 58. Upon a coincidence between the read signal and the sector found signal, along lines 56 and 50 respectively, the gate 60 provides a sector read signal, SR which is in turn applied to the input of the flow switching means 26, as schematically shown in FIG. 1. Similarly, a coincidence between the write signal and a sector found signal, along lines 58 and 50 respectively, is applied through the gate 62 to form a sector write signal SW which is also applied as a gating input command to the flow switching means 26. It will therefore be evident, in terms of a general operative description, that the present invention provides at desired intervals, individual data words making up a complete block of data represented by a disk sector. Each data word is individually strobable upon command received from the data line in accordance with the specific instructions provided to flow switching means 26 since each individual data word is immediately available at the output of the serial memory 20. Since the system operates in a bidirectional manner, the reading of individual data words from a sector received from the processor onto the disk, or from the disk back into the processor, is therefore feasible.

By way of further explanation, a more detailed presentation of the foregoing generally illustrated concepts will now be presented. Two general descriptions will be provided, hardware and software.

I. HARDWARE

For purposes of illustration, without intending to be limiting, the present invention may employ as an appropriate disk file a unit manufactured by the Shugart Corporation, Division of Xerox Data Systems, Model SA- 800. With reference to FIGS. 3 and 4, the pin interconnects between the present invention, as described in further detail with respect to FIGS. 3A–F, is shown with respect to the input connections for the data bus (below) and a floppy disk such as the Shugart AS-800 (FIG. 4).

The interface unit 14 interfaces with the MULTIBUS through an 86 pin connector, identified with the legend P1, and with the disk drive via a further connector identified with the legend J1.

For purposes of illustration, the following table indicates the bus connector (P1) signals.

| PIN | MNEMONIC | DESCRIPTION |
|---|---|---|
| 1–2 | GND | Signal Ground |
| 3–6 | +5 | +5 VDC |
| 11–12 | GND | Signal Ground |
| 14 | INIT/ | System initialization signal that conditions the system to a known state. |
| 21 | IORC/ | The read command takes data from the addressed unit. The 8-bit address is on both the 8-upper address lines and the 8-lower address lines. |
| 22 | IOWC/ | The write command sends data to the addressed unit. |
| 23 | XACK/ | The transfer acknowledge signal tells the processor board that the command has been completed. |
| 51/58 | ADR0/-ADR7/ | The system 14 uses only the 8-lower address lines (ADR0/ADR7/) of twenty. |
| 67–74 | DAT0/-DAT7/ | Eight bi-directional data lines where DAT0/ is the least significant. |
| 75/76 | GND | Signal Ground |
| 79–80 | −12 | −12 VDC |
| 81–84 | +5 | +5 VDC |
| 85–86 | GND | Signal Ground |

BUS CONNECTOR (P1) SIGNALS

The connections for the disk drive plugs correspond to the signal and pin identification numbers in the following table.

| PIN | SIGNAL | DESCRIPTION |
|---|---|---|
| 14 | HEAD1/ | Head select signal |
| 18 | HOLD | Hold the head down |
| 20 | INDEX/ | Index/sector holes |
| 22 | DOOR/ | Status of the disk-drive door |
| 26 | DRIVESL0/ | Select Drive 0 |
| 28 | DRIVESEL1/ | Select Drive 1 |
| 32 | DMOTON/ | Motor On/Off Control |
| 34 | DIRECTION | Motional direction of the head |
| 36 | STEP | Step pulse |
| 38 | WRITE DATA | Record data onto the disk |
| 42 | TK00 | Track 00 identification signal |
| 44 | WTPROTECT/ | Write protect signal |
| 46 | READ DATA | Read data recorded on the disk |

DISK-DRIVE INTERFACE SIGNALS

The system hardware will now be described in further detail with reference to FIGS. 3 A–F, which should be viewed as a group of figures. Signal inputs and outputs are shown on corresponding figures by coordinate locations. Not all logic components illustrated are described. For convenience, a listing of components and locations is as follows:

| U # | FIGS. 3 A–F |
|---|---|
| 1 | A |
| 2 | A; B; C |
| 3 | A; B |

-continued

| U # | FIGS. 3 A–F |
|---|---|
| 4 | A; B |
| 5 | A |
| 6 | D |
| 7 | D |
| 9 | C |
| 10 | C |
| 11 | A |
| 12 | A |
| 13 | A |
| 14 | A |
| 15 | A |
| 16 | D |
| 17 | D |
| 18 | D |
| 19 | C |
| 20 | C |
| 21 | A |
| 22 | A |
| 23 | A |
| 24 | C; B |
| 25 | D |
| 28 | C |
| 29 | B |
| 30 | B |
| 31 | C |
| 32 | C |
| 33 | E; B |
| 34 | E |
| 36 | D |
| 37 | C |
| 38 | C |
| 39 | B |
| 40 | B; A |
| 41 | B; D; E |
| 42 | C |
| 43 | B |
| 44 | E |
| 45 | E |
| 46 | E |
| 47 | C |
| 48 | C |
| 49 | B |
| 50 | B |
| 51 | A; D; E |
| 52 | B; E |
| 53 | E |
| 54 | E |
| 55 | C |
| 58 | B |
| 60 | E |
| 61 | E |
| 62 | E |
| 63 | E |
| 64 | E |
| 65 | C |
| 66 | C |

The interface unit performs either a read or write operation using the following MULTIBUS signals.
1. ADR0/ thru ADR7/ address is the interface.
2. DAT0/ thru DAT7/ form the 8-bit data and command word.
3. INIT/ conditions the system to a known state.
4. IORC/ transfers data from the interface to the processor via eight, bi-direction data lines.
5. IOWC/ sends data to the interface via the eight, bi-directional data lines.
6. XACK/ tells the processor to terminate the command.

The following section will describe system operations.
1. Addressing

Referring to FIGS. 3A–F, the MULTIBUS outputs ADR2/ thru ADR7/ address the desired interface unit 14 via Comparator U60. These input levels are compared with the board address that is set up on the hardware-matrix.

1.1 Sector Address

MULTIBUS signals DAT0/ thru DAT4/ make up the sector address. When the MSC 8101 accepts a command, the address is retained in COMMAND LATCH U53. In turn, SECTOR COMPARATOR U58 accepts these inputs and compares them with the outputs of the SECTOR COUNTER U50. This counter is incremented with a SECTOR INDEX pulse from the disk drive via U40 and U32. Upon reaching the desired sector, pin 9 of U58 (SECTOR) asserts a "high" on pin 2 of the INITIATE gate U13.

2. Command Decoding

The MULTIBUS asserts command word DAT0/ thru DAT7/ on the inputs of U62 and 63. In turn, these bits are applied to U22 and 23, if the MULTIBUS CONTROL DECODER U64 asserts a "low" on the COMMAND WT/line. This "low" also forces PULSE/ "low" via U46.

2.1 Group

Circuit U23 establishes one of four operations (Refer to paragraph I A.1 above) through the decoding of B5 and B6. A "low" on both lines of the selected unit (B0's "low") forces pin 12 of U4 "low", setting all circuits to a known state.

2.2 Command

A "high" on both B5 and B6 denotes that one of eight operations will be used to control the disk (Refer to paragraph I A.2 above). This condition asserts a "low" on the COMMAND ENABLE line, enabling the COMMAND DECODER U22 to decode inputs B2, B3 and B4. With a "high" representing a logic "1" and a "low", a logic "0", these inputs are decided as follows:

| B4 | B3 | B2 | OUTPUT SIGNAL (low) | RESULTS |
|----|----|----|---------------------|---------|
| 0  | 0  | 0  | BUSIN/              | Set bus for write |
| 0  | 0  | 1  | BUSOUT/             | Set bus for Read |
| 0  | 1  | 0  | CURROFF/            |         |
| 0  | 1  | 1  | CURRON/             |         |
| 1  | 0  | 0  | MOTOFF/             |         |
| 1  | 0  | 1  | MOTON/              | Turn on drive motor, select head and drive strobe |
| 1  | 1  | 0  | SOUT/               | Step head to Track 00 |
| 1  | 1  | 1  | SIN/                | Step head to inner Track |

2.3 Data Flow Control

A "low" on BUSIN/ sets BUS DIRECTION flip-flop U21, forcing RDS "high". Signal RDS defines BIT 2 condition of the Status register U44 and 45. This condition implies a read operation and RD/ (complement of RDS) establishes a data flow from the disk through the FIFO DATA BUS onto the MULTIBUS. A "low" on BUSOUT/ resets U21 to force RDS "low", signifying a write operation. This condition reverses the data flow. Now information goes from the MULTIBUS through the FIFO DATA BUS to the disk drive.

2.4 Head Current

Some floppy-disk systems, other than Shugart, require the head current to change, depending on the track being written—the purpose of this command. A "low" on CURROFF/ resets CURRENT SWITCH flip-flop U21. In turn, output signal CURSW/ to the disk drive is asserted "high". When CURRON/ goes "low", U21 is set, forcing CURSW/ "low".

2.5 Motor Control

Systems having separate motor control use control level DMOTON/ (J1, pin 32). A "low" on MOTOFF/ resets MOTOR flip-flop, causing DMOTON/ to go "high". When MOTON/ goes "low", U21 is set, forcing DMOTON "low". However, INITIATE signal that initiates either a read or write operation is delayed approximately 5 seconds via MOTOR START TIME U29 so that the disk drive is full speed before the operation begins.

2.6 Stepping Control

Repeated pulsing on STEP/ (J1, pin 36) moves the head of the disk drive in the direction defined by DIRECTION (J1, pin 34). If the head is to be stepped toward Track 00, the COMMAND DECODER U22 asserts a "low" on SOUT/. This level generates a positive pulse (U29, pin 5) if TK00 is "high"—signifying that the head is not positioned over Track 00. The rising edge of the pulse triggers U39, asserting a "low" on STEP/ for 12 microseconds. A "low" on SIN/ moves the head toward the inner-most track. This signal generates the pulse from U29. In turn, a "low" is now asserted on STEP/. Both conditions assert "low" on STEPPING/ and STEP/—signals used in the INITIATE gate U13.

3. Sector Read

The processor starts a sector-read operation, by sending a READ SECTOR command (bit 6 "high", bit 5 "low") with the desired sector number merged in bits 0 thru 4. This causes the head to be loaded if it is not already and starts a search for the addressed sector.

3.1 Sector Search

After locating the desired track (Refer to paragraph 2.6) with the selected head, the electronics are ready to be synchronized with the disk-drive circuits and locate the desired sector of information (See paragraph 4.3.1.1). When the addressed sector has been located, INITIATE (U13, pin 6) goes "high" and sets U49 forcing SECTOR FOUND "high" to set FIND FIRST ONE flip-flop (RSYNC goes "high"), initiating the read of the Preamble.

3.2 FIFO Bus Operation

Data from the disk (READ DATA) is asserted into U32 and the rising edge triggers RCLK. This pulse through U6, U16 and U36, generates signal IR shown entering in FIG. 3C which allows one byte of data to be placed into the FIFO and on the DATA READ BUS (RD0 through RD7). If there is no information in the FIFO DATA BUS, RCLK goes "low", forcing U36 output IOBSY "low". Bit 6 of the Status Register indicates this condition (See Paragraph 2).

Once the data is in the FIFO, the program can retrieve it through successive reads from the data address. Asserting IORC/ places the data onto the MULTIBUS. After the processor receives the data, it is shifted out of the FIFO so that the next byte can fall through.

4. Sector Write

When the processor issues a write command to the data address, a "low" as asserted onto the IOWC/ input. The MULTIBUS CONTROL DECODER U64 generates the signal WSTROBE FIG. 3E. In turn, WSTROBE generates the signal SO (U36) FIG. 3D to permit the MULTIBUS data D0 thru D7 to be entered into the FIFO DATA BUS.

When the data for a complete sector is in the FIFO, a WRITE SECTOR command is then asserted to transfer this data from the FIFO to the disk. The processor sends this command (bit 6 "low" and bit 5 "high") with bits 0 thru 4 defining the desired sector. As soon as the sector is located; pin 9 (SECTOR) of the SECTOR COMPARATOR (U58) goes "high", is gated with a write signal in U12, and generates the INITIATE signal via U13. The data is then strobed out of the FIFO, by signal SO, one byte at a time into an 8-bit shift register (U47 and 48). In turn, the data is shifted from the shift register one-bit at a time to the disk through data encoder U51 at a bit rate of either 125 or 250 KHz, depending on the type of drive. A crystal oscillator (U7); a divider network, and a jumper interconnect establishes the bit rate.

5. Status Register

Circuits U44 and 45 asserts 8-bits of data (D0 thru D7) onto the MULTIBUS that inform the processor of the operating status of the floppy-disk system. The definition of these bits are shown in the following table and discussed in paragraph 2).

| D7 | D6 | D5 | D4 | D3 | D2 | D1 | D0 |
|---|---|---|---|---|---|---|---|
| DRIVE BUSY | I/0 BUSY | WRITE PROT. | DOOR | TRACK 00 | DATA DIR. | HEAD | DRIVE |

When the MULTIBUS CONTROL DECODER U64 asserts a "low" on STAT RD/, the condition of the Status Register is sent to the processor. The UNIT SELECT flip-flop U5 defines bit D0—a direct relationship to the B0 output of the COMMAND LATCH U53. There is a similar affiliation with bit D1 except that D1 is associated with head selection, the output of the HEAD SELECT flip-flop U5.

Bit D2 identifies the direction of data flow as established by the BUS DIRECTION flip-flop. A "high" on D2 signifies a read operation and that data is to be asserted onto the MULTIBUS. A "low" denotes a write and data will be accepted from the MULTIBUS and written onto the disk.

Bit D3 signifies that the head is on Track 00 with a "high". A "low" asserted on J1, pin 22 (DOOR/) controls Bit D4 via gate U2 and 14. Bit D5 is the result of input-level WTPROTECT/ applied to pin 44 of J1. This level forces DRIVE BUSY/ "low"via gates U11 and 13, causing Bit D7 to indicate a busy drive system (Refer to paragraph 2). Other signals that effect D7 are output of READ flip-flop; WRITE/, and MOTOR START TIMEOUT flip-flop. These signals control the output of U13. For IOBSY indication, D6 is "low" denoting that the FIFO buffer is busy. This bit goes "high" when the buffer is ready for data transfer.

II. SOFTWARE

This section describes the command structure and procedures needed to program a floppy-disk system using the Interface/Controller.

A. Command Structure

The present invention accepts from the MULTIBUS an eight-bit word (DAT0/ thru DAT7/) that either defines the mode of operation or contains data that is to be acted on. The first configuration provides the command structure that specifies the mode of operation (See Table 3). The second contains the data that is transferred to and from the MULTIBUS, depending on the mode of operation.

TABLE 3

| COMMAND WORD FORMAT | | | | | | | |
|---|---|---|---|---|---|---|---|
| DAT7 | DAT6 DAT5 GROUP | DAT4 | COMMAND DAT3 DAT2 SECTOR/COMMAND | | | HEAD/DRIVE SELECT DAT1 DAT0 | |

A.1 Group

Bits DAT5 and 6 define four modes of operation—Reset, Sector Write, Sector Read and Command operations. The following table lists these modes in terms of the MULTIBUS inputs DAT5/ and DAT6/ (Active low: "low" for 1, "high" for 0).

| DAT6 | DAT5 | MODE |
|---|---|---|
| 0 | 0 | Reset |
| 0 | 1 | Sector Write |
| 1 | 0 | Sector Read |
| 1 | 1 | Command |

A.2 Command

Bits DAT2 thru DAT4 control the disk drive that is selected by bits DAT0 and DAT1 as follows:

| DAT1 | DAT0 | DRIVE | HEAD |
|---|---|---|---|
| 0 | 0 | 0 | 0 |
| 0 | 1 | 1 | 0 |
| 1 | 0 | 0 | 1 |
| 1 | 1 | 1 | 1 |

The three command bits define eight operations as outlined in the following table in terms of MULTIBUS input—signals DAT2/, DAT3/ and DAT4/. These signals apply only when DAT6 and DAT5 are logic "1" (Command Mode).

| DAT4 | DAT3 | DAT2 | |
|---|---|---|---|
| 0 | 0 | 0 | Set up the interface to receive data from the disk-drive system. |
| 0 | 0 | 1 | Transfer data from the disk system thru the buffer to the processor. |
| 0 | 1 | 0 | Control the head current. |
| 0 | 1 | 1 | Control the head current. |
| 1 | 0 | 0 | Turn the drive motor off. |
| 1 | 0 | 1 | Turn the drive motor on. Also used to strobe drive and head select. |
| 1 | 1 | 0 | Step the head out toward Track 00. |
| 1 | 1 | 1 | Step the head in toward the inner track (SA800/SA850, Track 76; SA400/SA450, Track 34). |

Based on the command word format (Table 3), the complete commands as used in a program to control a disk are:

| HEX NOTATION | COMMAND WORD | DESCRIPTION |
| --- | --- | --- |
| 00 | 00000000 | System Reset |
| 10 + Sector No. | 0010ssss | Write Sector "ssss" |
| 40 + Sector No. | 0100ssss | Read Sector "ssss" |
| 60 + Command | 0110cccc | Perform one of the following Commands, defined by cccc |
| 60 | 01100000 | Set Up To Read |
| 64 | 01100100 | Set Up To Write |
| 74 + Unit No. | 01101uu | Select Unit "uu" |
| 78 | 01111000 | Step Out Toward Track 00 |
| 7C | 01111100 | Step In Toward Inner Track |

A.3 Special Considerations

The following points should be considered when programming.

1. If a "Motor On" command (Hex 74) is issued, there is a delay impossed to guarantee that the sector counter is synchronized with the disk drive. It is recommended to select "Motor On" only when changing from one unit to another.

2. The internal data buffer is automatically reset upon the assertion of either a "Read Sector" or "Setup Write" command. This means that data from the previous transaction is cleared.

3. During the "Step Out" operation, the interface is busy for the step time unless the selected unit is at Track 00. If the drive is at Track 00, a busy condition will not be generated. This situation provides a convenient software aid to find Track 00 through the testing of busy signals.

B. Status Register

An internal, 8-bit register asserts information into the MULTIBUS to denote functional conditions of the disk drive and the interface system. Designation for each of these bits are as follows:

DAT0 and DAT1 (least-significant bits) are identical to the settings of DAT0 and DAT1 during a "Motor On" command. DAT0 selects the drive and DAT1 the head.

DAT2 indicates the direction of data flow. A "high" signifies Sector Read and a "low" for Sector Write.

DAT3 identifies Track 00 with a "low" asserted onto the MULTIBUS. For all other tracks, this bit is "high". If the user does not know the position of the head, if it is recommended to "step out" to Track 00 and then "step in" to the desired track.

DAT4 tells the user that the door of the selected unit is open with a "high". This signal is not available on all types of drive.

DAT5 is "high" when the disk media is write protected, inhibiting a write command. This bit must be "low" to perform a write operation.

DAT6 signifies a busy FIFO buffer when "low". A "high" indicates that the buffer is ready for data transfer.

DAT7 (most-significant bit) denotes a busy drive system when "low". A "high" means that the drive will accept a command from the processor.

C. Programming Sector Read

The following procedure is recommended to program a disk drive for Sector Read using the interface system.

1. Verify that the unit is ready to accept a command and transfer data.

2. Confirm that DAT2 of the Status register is "high", signifying that data will flow from the disk drive to the Processor.

3. Position the head to the desired track using one of three techniques.

Method 1: Step to Track 00, then count into the proper track.

Method 2: Store the track number being operated on into the computer. Then use this number to compute through software the number of steps and direction needed for the next track change.

Method 3: Record within each sector, a block of information containing the track number. This number will by read out and used to compute the number of steps and direction of movement for the next track change. For increase reliability, Method 2 and 3 combined minimizes any errors that could occur due to erroneous stepping.

4. Issue a READ SECTOR command (Hex 40) from the processor with the proper Sector address or number.

5. Start testing DAT6 of the status register. When data is ready, DAT6 goes "high", indicating to the processor that data can now be read from the bus.

6. Continue with the read operation until all data within a sector has been read into the computer (132 and 144 useable bytes/sector, depending on the type of floppy disk drive).

7. If there is a further attempt to read more data than contained within a sector, DAT6 of the Status register will be "high" indicating a busy I/O. However, the last byte of data will be read repetitively.

D. Programming Sector Write

A Sector Write is accomplished in the following manner:

1. Perform Steps (1) through (6) of paragraph C (Sector Read).

2. Establish the write current if the disk is so equipped.

3. Send a "Preamble" to synchronize the read electronics. For a standard disk system, the Preamble consists of eight "0" bytes proceeded by one byte of Hex 80 (decimal 128).

4. Insert data into the buffer. It is recommended that the first byte to be recorded contains the track number for software check (refer to Method 3 under Step 3 or paragraph C).

5. Send a "Postamble" byte of Hex 00. This will be repeated automatically by the FIFO buffer until the end of the sector.

6. Issue a WRITE SECTOR command (Hex 20) to write the data onto the disk. Even though the program step is complete, it is recommended that the user wait until DAT7 of the Status register goes "high", indicating the interface is not busy and the write operation has actually terminated. Then read the data back for verification. This requires time, but increases reliability. If many blocks of information are being written, it is quicker to write all the information and then check all the data.

What has therefore been described as a device capable of construction as a single board flexible disk drive interface controller for MULTIBUS compatible computer systems. All interface and control functions have been provided for single density hard sector disk operations, both in single and dual head drives. The interface is a MULTIBUS interface for regular 8 inch or mini 5 inch disk drives, useable with such units as the Shugart SA-800, SA-850, SA-400 and SA-450.

The unit itself may be configured in a single printed circuit board and capable of supporting at least two disk drives. The first-in first-out serial memory, operating as full sector buffer with 190 byte capacity, provides timing independence for completely asynchronous computer communication. In an 8 bit system, a first-in first-out serial memory may be the Fairchild 3341/3341A which is a 64 word×4 bit memory that operates in a first-in first-out mode. By arranging two such units in parallel, as shown in FIG. 4, an 8 bit word may be generated as two parallel 4 bit words.

High data transfer rates are thus achieved without a bus master direct memory access controller and real time systems can operate more efficiently with a disk system that does not content with the processors for the bus. A higher priority processor or DMA interface has bus precedence over the interface unit of the present invention at any instant for any length of time without data loss. In addition, the first-in first-out concept allows the computer to read the first byte of data that falls through the buffer. This reduces the latency introduced by other buffering algorithms that require an entire sector to be read before the computer receives data.

The supporting software includes a complete disk monitor system which may be provided for the interface board. The disk monitor software is designed for throughput and reliability. In accordance with the operation of the present invention 32K bytes may be loaded in 10 seconds, and saving 32K bytes of data requires 54 seconds. For write operations, the software reads to verify positioning and then checks each block of data after it is written. This redundancy enhances system reliability without hindering system operations significantly. Although data confirmation may be employed, the interface unit of the present invention may be programed to write data at the full speed of the disk without data verification. Because new commands and I/O devices are easily interfaced onto the system, the supporting software may be used as the basis for a disk based system.

Other advantages and utilizations of the present invention will be apparent to one skilled in the art. Modifications, deletions, omission, substitutions and variations will be apparent to one skilled in the art within the spirit and scope of the present invention, as defined by the appended claims.

What is claimed is:

1. In an information transfer system for connection between a bus and a storage device; the improvement wherein said information transfer system comprises intermediate storage means having a data input and a data output for storing blocks of parallel data of determined length, a register having parallel inputs and outputs and serial inputs and outputs, first selection means for applying data on said bus or the parallel output of said register to the input of said intermediate storage means, means applying the output of said intermediate storage means to the parallel input of said register, second selection means applying the output of said intermediate storage means to said bus, means coupling said storage device to said serial inputs and outputs of said register, and control means responsive to control signals on said bus for controlling said first and second selection means.

2. The system of claim 1, wherein said intermediate storage means comprises a plurality of registers arranged to operate in a FIFO mode with respect to the blocks of parallel data.

3. The system of claim 2, wherein said register comprises a shift register.

4. The system of claim 3, wherein said first selection means comprises a data selector, and said second selection means comprises gate means.

5. In an information transfer system for connection between a parallel bus and a mass storage device having serial inputs and outputs, said bus carrying data and control signals; the improvement wherein said information transfer system comprises parallel storage means, a register having serial inputs and outputs coupled to serial outputs and inputs respectively of said mass storage device, a parallel input of the register coupled to the output of said parallel storage means, selector means for selectively coupling said bus and the parallel output of said register to said parallel storage means, and gate means selectively coupling the output of said parallel storage means to said bus.

6. The system of claim 5 further comprising control means responsive to control signals on said bus for controlling said selector means, said gate means and said register, whereby data may be selectively transferred between said bus and said mass storage device.

7. The system of claim 6, wherein said parallel storage means comprises a plurality of registers arranged to operate in a FIFO mode.

8. An information transfer system for connection between a bus and a mass storage device, comprising an intermediate storage device for storing a block of data of determined length and having an input and an output, a register having a first input coupled to the output of said intermediate storage device, a second input coupled to said mass storage device, a first output coupled to said mass storage device, and a second output, means selectively coupling said bus and second output to the input of said intermediate storage device, and gate means for selectively applying the output of said intermediate storage device to said bus.

9. The system of claim 8 in which said intermediate storage device comprises means for storing a plurality of parallel data words and said register comprises a shift register, said first input comprising a parallel input, said second input comprising a serial input, said first output comprising a serial output and said second output comprising a parallel output.

10. The system of claim 9, wherein said intermediate storage device comprises a plurality of registers arranged to operate in a FIFO mode with respect to parallel data words.

11. The system of claim 10, wherein said bus carries data signals and control signals, said system further comprising a control system responsive to control signals on said bus for controlling said means selectively coupling, gate means, and register, whereby control signals on said bus may direct the loading of said intermediate storage device from said mass storage device so as to be applied at a later time to said bus.

* * * * *